United States Patent Office 2,815,056
Patented Dec. 3, 1957

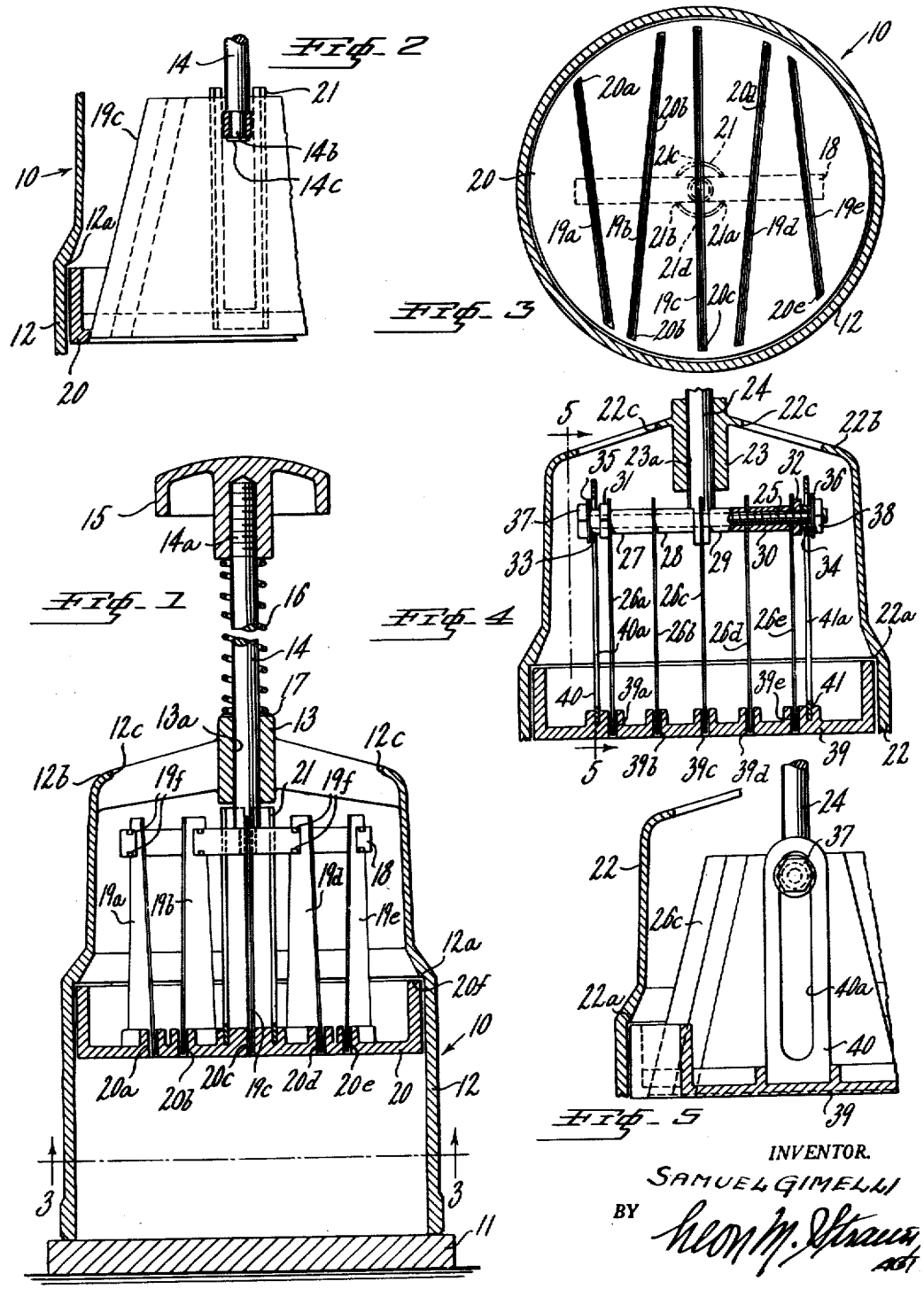

2,815,056
FOOD CHOPPING DEVICES
Samuel Gimelli, Bern, Switzerland
Application June 30, 1955, Serial No. 519,152
4 Claims. (Cl. 146—69)

This invention relates to a cutting device for chopping up food stuffs, such as fruits, vegetables, and other like food products.

It is an object of the present invention to provide means facilitating and safely performing cutting operations on articles of food to cut the latter into relatively big slices, as well as into smaller pieces selectively and in a facile and rapid manner.

It is another object of the present invention to provide means affording a compact and extremely handy mechanical device for cutting up articles of food in the aforesaid manner, which device effects a substantial reduction in the number of cutting strokes required by utilizing a plurality of blades capable of completing the cutting operation in one or two strokes.

It is still another object of the present invention to provide means conducive to an inexpensive yet highly efficacious food cutting or chopping device of the aforesaid type which enables the food article to be cut to the desired form within the confines of a relatively small area and without being handled or manually moved by the cutter throughout the entire cutting operation.

A further object of the present invention is to provide means, in a cutting device of the aforesaid type, ensuring substantially complete cutting and chopping of the food product involved as well as ensuring, through the medium of suitable stripping means cooperating with angularly arranged cutting blades, complete removal of any pieces of said food product from said cutting blades, thus reducing waste of food normally encountered in such chopping operations.

Still a further object of the present invention is to provide means contributing to an improved and greatly simplified cutting device for chopping up food stuffs, which device includes a substantially cylindrical housing which remains stationary during the entire cutting operation, and a set of cutting blades which are both longitudinally and angularly movable relative to and within the housing.

These and other objects of the invention will become further apparent from the following detailed description, reference being made to the accompanying drawing showing preferred embodiments of the invention.

In the drawing:

Fig. 1 is a sectional elevational view of the food cutting device embodying the present invention and illustrates the cutting blades in their uppermost position preceding a cutting or chopping operation;

Fig. 2 is a partial sectional elevational view of a detail of the device of Fig. 1, the view being taken substantially at right angles to the axis of said device;

Fig. 3 is a sectional view taken along the line 3—3 in Fig. 1;

Fig. 4 is a sectional elevational view of a modified form of food chopping device embodying the present invention; and Fig. 5 is a sectional view taken along the line 5—5 in Fig. 4.

Referring now more particularly to Figs. 1 to 3, the food chopping device, generally designated by the reference numeral 10, is shown as positioned on a chopping plate 11 which may be made of wood, metal, plastic or other suitable materials. The chopping device 10, in essence, consists of a substantially cylindrical housing 12 having lower and upper sections or portions of different diameters, the two portions thus defining an annular shoulder 12a substantially centrally of the housing 12.

Provided in the top wall 12b of the housing 12 are openings or windows 12c and a bushing 13, through the central bore 13a of which extends a push rod 14 of substantially circular cross-section. The rod 14 is slidably disposed in the bushing 13 for both axial and rotary movement therein. Affixed to the upper threaded end 14a of the rod 14 is a manipulating member 15, such as a knob or cap, by means of which the rod may be pushed through and rotated in the bushing 13.

Surrounding the rod 14 is a coiled compression spring 16, one end of which bears against a suitable washer or bearing plate 17 disposed on the upper end of the bushing 13 and coaxially with the bore 13a. The other end of the spring bears against a portion of the cap or knob 15. The spring 16 thus biases the rod 14 toward and tends to maintain the rod 14 in its uppermost position relative to the housing 12.

The lower end 14b of the rod 14 is substantially rectangular in cross-section and extends substantially transversely through a rectangular carrier bar 18. The bar 18 is retained on the lower rod portion 14b by means of a flange 14c or other suitable fastening means. On the carrier bar 18 are supported cutting blades 19a, 19b, 19c, 19d and 19e, the blades being attached to the carrier bar by means of suitable fasteners or clamping means 19f.

As may be seen most clearly from Figs. 1 and 2, the various cutting blades 19a to 19e are substantially plane and trapezoidal in shape. If desired, however, they may be corrugated or provided with other types of alternating elevations and depressions designed to impart similar surface contours to the various pieces of food to be formed by cutting.

The cutting blades 19a to 19e depend substantially at right angles from the carrier bar 18 but are arranged at acute angles relative to each other. Thus, a space of varying width is defined between each adjacent pair of cutting blades for a purpose to be more fully explained hereinafter. As may be seen from Figs. 1 and 3, blade 19c is arranged substantially along the diameter of the housing 12.

Slidably disposed in the lower and wider portion of the housing 12 is a substantially circular, cup-shaped stripper plate 20, the flat bottom surface of which is traversed by a number of angularly disposed slots 20a, 20b, 20c, 20d and 20e through which the various blades 19a to 19e slidably extend. The length of each of these slots at the lower surface of the plate 20 is substantially equal to the length of the lower edge of its corresponding cutting blade.

The end walls of each slot are slanted and converge upwardly from the lower surface of the stripper plate 20, whereby said stripper plate, when located adjacent the lower or cutting edges of the blades 19a to 19e, will be supported by said blades. The interengagement of the slanted side edges of the cutting blades 19a to 19e with the slanted end walls of the slots 20a to 20e, respectively, serves to prevent withdrawal of the blades from the stripper plate.

Fixed to the upper surface of the stripper plate 20 and substantially centrally thereof is a guide member 21 which forms an abutment against the bushing, and, in essence, is a cylindrical tube or sleeve provided with four circumferentially spaced longitudinal slots 21a, 21b, 21c and 21d. The slots 21a and 21b are diametrically opposed to each other, as are the slots 21c and 21d. The slots 21a and 21b are sufficiently wide to accommodate the carrier bar 18 while the slots 21c and 21d are sufficiently wide to accommodate the central cutting blade 19c.

In operation, an article of food to be chopped up, such as an onion, for example, is placed on the chopping board 11, and the housing 12 of the chopping device 10 is then placed onto said board and over the onion. The spring 16 at this time urges the push rod 14 upwardly together with the cutting blades 19a to 19e, the uppermost position of the latter being determined by the engagement of the upper rim 20f of the stripper plate 20 with the shoulder 12a formed at the junction of the upper and lower sections of the housing 12.

Upon application of manual pressure to the cap or knob 15, the spring 16 is compressed and the rod 14, the blades and the stripper plate 20 move downward as a unit until the stripper plate engages the onion. Thereafter, the stripper plate remains stationary and the blades continue their downward movement, passing, respectively, through the slots 20a to 20e and cutting through the onion until they contact the chopping board 11.

The cap is now released to enable the spring 16 to return the cutting blades to their upper or rest position. Should the slices of the onion adhere to the cutting blades as the latter move up, it will be seen that as soon as the upper rim 20f of the stripper plate 20 contacts the shoulder 12a of the housing 12 further movement of the stripper plate will be inhibited while the blades continue their upward movement.

This ensures that the onion slices retained between the blades will be stripped therefrom and redeposited on the chopping board. The angular positioning of the cutting blades 19a to 19e facilitates the dislodging of the slices from the blades by enabling said slices to move from the narrower portions of the spaces between the blades toward the wider portions thereof during the stripping operation.

Should it be desired to further chop up said onion into smaller pieces, it is merely necessary to rotate the cap 15 together with the rod 14 and the cutting blades 19a to 19e one or more times through the desired angles and then to repeat the previously described chopping operation after each rotation of the rod 14.

It will be noted that though the bearing bushing 13 guides the rod 14 in its rectilinear or axial movements, it does not prevent rotation of the rod during a chopping operation. In that eventuality it might occur, should the article of food being cut be relatively tough and hard and a piece thereof become wedged between the stripper plate and the inner surface of the housing 12, that the rod 14 and the cutting blades are given a turn or twist while the stripper plate remains stationary. This would result in a substantial distortion of the blades, thus rendering the chopping device useless.

The function of the guide member 21 is, therefore, primarily to prevent such distortion. Due to the presence of this guide member the rod 14 cannot be rotated without entraining the stripper plate 20 into concurrent rotation. Thus all rotary movements of the cutting blades 19a to 19e relative to the stripper plate 20 are inhibited and consequent inadvertent damage to the device is prevented.

Referring now to Figs. 4 and 5, the modification of the invention there illustrated includes a housing 22 substantially similar to the housing 12 illustrated in Fig. 1. The housing 22 has narrower and wider upper and lower portions defining an annular shoulder 22a, openings or windows 22c being provided in the upper wall 22b of the housing.

A bushing 23 is disposed in said upper wall 22b and presents a bore 23a in which the push rod 24 is slidably and rotatably retained. In the lower, flattened end 24a of the push rod 24 there is provided an opening through which extends the carrier bar, here shown as a threaded bolt or shaft 25 substantially at right angles to the axis of the push rod 24.

Cutting blades 26a, 26b, 26c, 26d and 26e are suspended from the threaded bolt 25 in substantially parallel relation, the bolt passing through a hole provided in each blade adjacent its top edge. The cutting blades are spaced from each other by means of suitable spacer sleeves 27, 28, 29 and 30 slidably disposed on the threaded bolt 25. Nuts 31 and 32 hold the outermost blades 26a and 26e against their corresponding spacer sleeves 27 and 30 on the bolt 25. Two spacer washers 33 and 34 are located on the bolt or shaft 25 and adjacent the outer sides of the nuts 31 and 32 and are, in turn, retained on the bolt by means of bearing washers 35 and 36 and nuts or bolt heads 37 and 38.

Slidably disposed in the lower portion of the housing 22 is a stripper plate 39, substantially cup-shaped like the stripper plate 20 of Figs. 1 to 3. In the stripper plate 39 are formed a plurality of parallel slots 39a, 39b, 39c, 39d and 39e through which the blades 26a to 26e are slidably movable, respectively.

Fixed to and extending upwardly from the stripper plate 39 and parallel to the cutting blades 26a to 26e are guide members 40 and 41 provided with longitudinal slots 40a and 41a, respectively. The bolt 25 extends through the slots 40a and 41a, the spacer washers 33 and 34 being so dimensioned as to ride along the sides of the slots 40a and 41a to prevent rotation of the push rod 24 relative to the stripper plate 39 and consequent twisting or distortion of the cutting blades 26a to 26e.

In the modifications of Figs. 4 and 5 it will be noted that engagement of the upper ends of the guide slots 40a and 41a with the carrier bolt or shaft 25 prevents the stripper plate 20 from falling below the lower edges of the blades 26a to 26e. Thus, although the cutting blades 26a to 26e are shown to be trapezoidal in shape, this is not absolutely necessary, nor is it necessary to slant the end walls of the slots 39a to 39e in the stripper plate 39.

In all respects, the operation of the chopping device of Figs. 4 and 5 is exactly the same as that set forth hereinabove with respect to the device illustrated in Figs. 1 to 3, the knob or cap 15 and the spring 16 not being shown in Figs. 4 and 5 for the sake of clarity. It is to be noted, however, that in each of the embodiments of the invention the spring 16 may be omitted. In that case, after each downward cutting movement of the cutting blades (19a to 19e or 26a to 26e) a manual upward pull must be exerted on the push rod (14 or 24) to strip the food pieces from the blades.

The housing (12 or 22) and the stripper plate (20 or 39) of the chopping device embodying the present invention may be made of metal or plastic materials, the housing being preferably made of transparent plastic materials to facilitate inspection of the inner surfaces for cleanliness. The openings or windows (12c or 22c) in the housing serve the same function and additionally facilitate cleaning of the device.

It will be readily realized, of course, that even in the embodiment of the invention illustrated in Figs. 4 and 5 the group of cutting blades 26a to 26e may be arranged in zig-zag relation in the same manner as the cutting blades 19a to 19e illustrated in Figs. 1 to 3.

Thus it will be seen that there has been provided, in accordance with a broad view of the invention, a food chopping device comprising a substantially cylindrical housing having an open bottom and a substantially closed top and adapted to be placed over an article of food to be chopped, a push rod extending through said top for sliding axial and rotary movement relative to said housing, a plurality of cutting blades fixedly suspended from said push rod within said housing, whereby said blades cut and chop said food article upon being moved toward said bottom of said housing by said push rod, a stripper plate disposed within said housing for sliding axial and rotary movement therein and provided with slots constituting passageways for said cutting blades, respectively, whereby said cutting blades may move relative to said stripper plate, slotted guide means located on said stripper plate and operatively connected with said push rod to prevent rotation of said push rod together with said cutting blades relative to said stripper plate, and means within said housing and engageable with said stripper plate at a predetermined distance above said bottom of said housing for impeding movement of said stripper plate toward said top of said housing as said cutting blades move toward said top, whereby any pieces of said food article adhering to said blades subsequent to being chopped by the latter will be stripped from said blades by said stripper plate.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A food chopping device comprising a cylindrical housing having lower and upper sections of different diameters defining an annular shoulder therebetween, a housing on top of said housing, a push rod slidably disposed in said bushing, said rod having a lower end rectangular in cross section, a carrier bar extending in transverse direction to said rod and connected to the latter, cutting blades having side edges, at least the lower portions of said side edges being trapezoidal in shape and terminating in lower edges, said cutting blades being supported on said carrier bar and including a central cutting blade and pairs of cutting blades extending from said carrier at acute angles relative to each other and to said central cutting blade, thereby defining between each of said pairs of cutting blades a space of varying width, a cup-shaped stripper plate disposed in the lower section of said housing and provided with a bottom surface traversed by angularly disposed slots for accommodating therein said cutting blades, respectively, the respective length of said slots at said bottom surface being substantially equal to the width of the lower edges of the corresponding cutting blades, the end wall defining each slot being slanted to correspond to the slant of said lower portions of said side edges of said blades, whereby said stripper plate when located adjacent said lower edges of said cutting blades are supported by the latter, and a sleeve-shaped guide member affixed to and extending from said stripper plate into said upper section of said housing toward said bushing and provided with diametrically opposed longitudinal slots of sufficient width to accommodate said carrier bar and said central cutting blade, respectively, therein, whereby said guide member will prevent damage to said cutting blades during concurrent rotative movement of said rod and stripper plate during operation, said guide member forming an abutment for said bushing when said stripper plate abuts said annular shoulder.

2. A food chopping device according to claim 1, wherein said cutting blades, said carrier and said stripper plate are connected to said rod for movement in axial direction of the latter as well as for rotation with the latter, said cutting blades being trapezoidal in shape throughout.

3. A food chopping device according to claim 1, wherein said cutting blades are arranged in zig-zag relation to each other.

4. A food chopping device according to claim 1, wherein said sleeve-shaped guide member is fixedly connected to said stripper plate.

References Cited in the file of this patent

UNITED STATES PATENTS

| 2,623,563 | Zeller | Dec. 30, 1952 |
| 2,625,972 | Torres | Jan. 20, 1953 |

FOREIGN PATENTS

| 265,458 | Switzerland | Mar. 1, 1950 |
| 1,084,832 | France | July 13, 1954 |

U. S. DEPARTMENT OF COMMERCE
PATENT OFFICE

CERTIFICATE OF CORRECTION

Patent No. 2,815,056 December 3, 1957

Samuel Gimelli

It is hereby certified that error appears in the printed specification of the above numbered patent requiring correction and that the said Letters Patent should read as corrected below.

Column 5, line 26, for "housing on top" read -- bushing on top --.

Signed and sealed this 1st day of April 1958.

(SEAL)
Attest:

KARL H. AXLINE
Attesting Officer

ROBERT C. WATSON
Commissioner of Patents